United States Patent
Nagaraj

(10) Patent No.: US 7,453,821 B2
(45) Date of Patent: Nov. 18, 2008

(54) METHODS OF DETECTING SIGNALING INFORMATION IN A WIRELESS COMMUNICATION SYSTEM

(75) Inventor: Shirish Nagaraj, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 877 days.

(21) Appl. No.: 10/853,102

(22) Filed: May 26, 2004

(65) Prior Publication Data

US 2005/0265249 A1    Dec. 1, 2005

(51) Int. Cl.
*G01R 31/08* (2006.01)

(52) U.S. Cl. .................. 370/252; 370/236; 370/328; 370/389; 370/410; 714/746

(58) Field of Classification Search ............. 370/252, 370/235, 328, 389, 410, 236; 714/746
See application file for complete search history.

(56) References Cited

U.S. PATENT DOCUMENTS

| | | | | |
|---|---|---|---|---|
| 7,054,633 B2* | 5/2006 | Seo et al. | ..................... | 455/439 |
| 7,069,038 B2* | 6/2006 | Hakkinen et al. | ............ | 455/522 |
| 7,116,651 B2* | 10/2006 | Hakkinen et al. | ............ | 370/329 |
| 7,124,343 B2* | 10/2006 | Moulsley et al. | ............. | 714/748 |
| 7,124,350 B2* | 10/2006 | Chao et al. | ................... | 714/776 |
| 7,143,330 B2* | 11/2006 | Ahn et al. | ..................... | 714/748 |
| 7,224,993 B2* | 5/2007 | Meyers et al. | ................ | 455/522 |
| 7,236,474 B2* | 6/2007 | Seo et al. | ...................... | 370/329 |
| 2003/0123396 A1* | 7/2003 | Seo et al. | ...................... | 370/252 |
| 2005/0042985 A1* | 2/2005 | Cheng et al. | ................... | 455/24 |
| 2005/0094561 A1* | 5/2005 | Raaf | ........................... | 370/235 |

* cited by examiner

*Primary Examiner*—Ricky Ngo
*Assistant Examiner*—Kibrom T Hailu

(57) ABSTRACT

In a method of detecting signaling information in a signal received in a wireless communication system, signaling information for a signal received in a subsequent time instant may be detected using an estimated value for the subsequent time instant. The estimated value for the subsequent time instant may be determined based on one or more measured parameters related to an estimated value for detecting signaling information in a current time instant.

20 Claims, 2 Drawing Sheets

METHODS OF DETECTING SIGNALING INFORMATION IN A WIRELESS COMMUNICATION SYSTEM

BACKGROUND OF THE INVENTION

1. Field of the Invention

The present invention is related, in general, to methods of detecting signaling information in a wireless communication system.

2. Description of the Related Art

An innovative aspect in third generation (3G) wireless communication systems is the offering of high-speed packet data services to end users. The Universal Mobile Telecommunications System (UMTS) may provide improved voice capacity as compared to earlier systems. However, the bulk of the innovation may lie in the ability of UMTS to provide a "fat pipe", or a shared channel, where packet data users are served with time-sharing or scheduling based on knowledge of their instantaneous channel quality. In UMTS, this channel is generally referred to as a high-speed downlink packet access (HSPDA) channel.

A wireless channel is inherently different from a wire line channel, in that a wireless channel is dynamic and has a time-varying capacity to carry information. Higher layer protocols such as TCP have been designed based on a premise that the links are constant capacity links and any failure to get a packet across is most likely due to congestion in the network elements. This assumption is not true for transmission over a single wireless link. Diversity, i.e., when the same signal arrives at the destination via multi independent paths, plays a role in wireless channel reliability. The diversity paths may be obtained in space (by multiple transmit or receive antennas) and/or in frequency (by resolving multiple propagation paths at different delays), and/or in time (by transmitting the same information over multiple blocks of time).

Spatial diversity requires the setting up and utilizing of additional antenna elements in the infrastructure and/or the mobile station, and multi-path diversity is a function of the propagation environment. On the other hand, utilization of time diversity may enable reliable packet data transmission in the packet data network when the last link is a wireless channel. This type of transmission may be achieved via what is referred to as Hybrid Automatic Repeat reQuest (HARQ). In a HARQ transmission, the same information is re-transmitted with a possibly different code, if one or more of the previous transmissions have failed. However, stabilizing effects of HARQ for improving link reliability may come at the cost of increased delay.

To enable a HARQ transmission, a reverse link channel (mobile to base station) should be available, which can signal, to the base station transmitter, if the particular transmission has been successful or not. This uplink channel should be designed to carry a signaling message containing a positive acknowledgement (ACK), or a negative acknowledgement (NACK), and/or not transmit anything (known as discontinuous transmission (DTX) frame, a frame with no data in it) when there is no packet to acknowledge. This signaling channel is known as the high-speed dedicated physical control channel (HS-DPCCH) in UMTS. The downlink (base station to mobile) capacity of a data channel such as HSDPA depends on the ability of the uplink receiver at the base station, to correctly detect these ACK/NACK/DTX signals. When a particular user is not scheduled by the base station (also known as the NodeB) transmitter, the ACK/NACK detector at the NodeB can know that and may expect a DTX (silence).

On the other hand, when the user has been scheduled, all three states (ACK/NACK/DTX) are possible. Although an ACK or NACK may be expected, a DTX may also be possible if the user did not decode that the downlink HSDPA transmission was intended for it. The downlink channel that carries the information as to whether a user is scheduled is known as a high-speed shared control channel (HS-SCCH). Thus, if the mobile (also known as a user equipment (UE)) misses decoding the HS-SCCH when it was actually being transmitted to it, the UE will not transmit anything (no message) on the HS-DPCCH signaling channel, even though the NodeB transmitter is expecting either an ACK bit or a NACK bit in the signaling message carried on the HS-DPCCH.

SUMMARY OF THE INVENTION

Exemplary embodiments of the present invention are directed, in general, to methods for detecting signaling information in a signal received in a wireless communication system. Signaling information in a signal received in a subsequent time instant may be detected using an estimated value for the subsequent time instant. The estimated value for the subsequent time instant may be determined based on one or more measured parameters related to an estimated value for detecting signaling information in a current time instant.

BRIEF DESCRIPTION OF THE DRAWINGS

Exemplary embodiments of the present invention will become more fully understood from the detailed description given herein below and the accompanying drawings, wherein like elements are represented by like reference numerals, which are given by way of illustration only and thus do not limit the exemplary embodiments of the present invention.

DETAILED DESCRIPTION OF THE EXEMPLARY EMBODIMENTS

Figure 1:
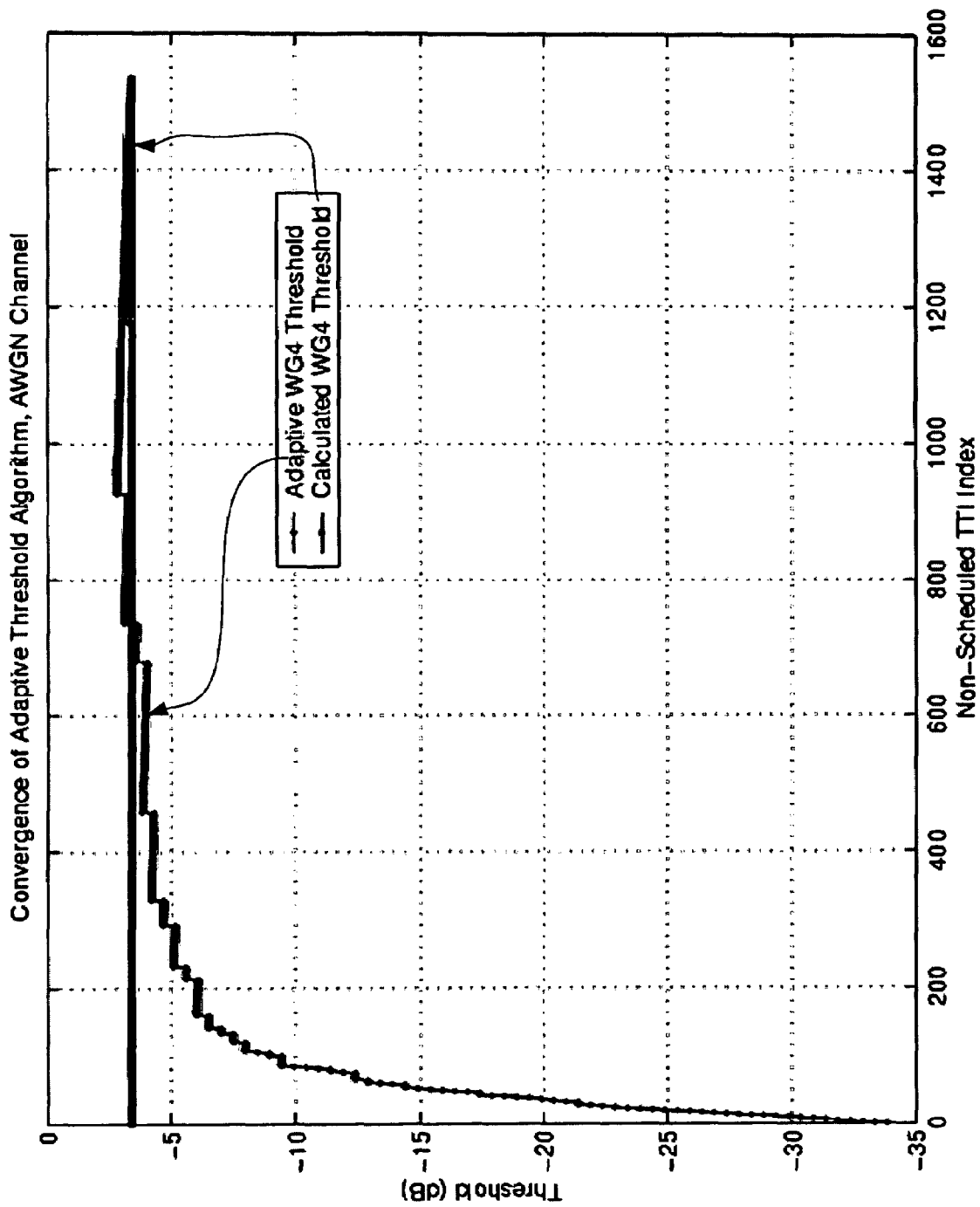
FIGS. 1 and 2 are graphs illustrating convergence behavior for a threshold determined in accordance with the exemplary embodiments of the present invention.

Although the following description of the present invention is based on the Universal Mobile Telecommunications System (UMTS) network infrastructure implementing a next generation Wideband Code Division Multiple Access (W-CDMA) air interface technology, it should be noted that the exemplary embodiments shown and described herein are meant to be illustrative only and not limiting in any way. As such, various modifications will be apparent to those skilled in the art. For example, it will be understood that the present invention finds application to any medium access control protocol and physical layer in other spread spectrum systems such as CDMA2000 systems, other 3G systems and/or potentially developing fourth generation (4G) wireless communication systems.

Where used below, base transceiver station (BTS) and NodeB are synonymous and may describe equipment that provides data connectivity between a wireless network and one or more mobile stations. Additionally where used below, the terms user, user equipment (UE), subscriber, mobile station and remote station are synonymous and describe a remote user of wireless resources in a wireless communication network.

In order to provide context for describing the exemplary embodiments in accordance with the present invention, the inventors describe a generic signal model, detection statistic and performance metrics related to the conventional detection scheme for ACK/NACK detection adopted by the Working Group 4 (WG4) of the UMTS standards body.

Signal Model

The HS-DPCCH channel may be used to carry ACK/NACK signaling information, as well as channel quality measurements (CQI). The HS-DPCCH may be code-multiplexed with the regular dedicated physical channel (DPCH) on the uplink. The HS-DPCCH channel may be placed on the I or the Q transmit branch, depending on whether the number of DPDCHs is even or odd. Since the transmission time interval (TTI) for a HSDPA downlink packet is 2 ms, which corresponds to three (3) slots, the ACK/NACK bit in the signaling message carried on the HS-DPCCH may be carried in the beginning of every third slot. The next two slots may be allocated for the CQI transmission.

The coding for the ACK/NACK bit may be a simple repetition code. For example, one bit gets mapped to N=10 symbols (N representing the number of symbols per slot of the TTI of the DPCCH), with binary phased-shift keying (BPSK) modulation. The ACK bit may be transmitted with the power of $P_A$, and may be pegged relative to the DPCCH. The power on the NACK may be referred to as $P_N$.

For the exemplary signal model, the transmission channel may be a wireless channel with L multiple paths. Any spatial received diversity may be due to additional antennas to be encompassed as modeling additional multipaths. A received signal, $(y_l(n))$, after de-spreading and de-scrambling for finger/l (where the HS-DPCCH is on the I channel) may be described by Expression (1):

$$y_l(n) = h_l(n)A(b) + v_l(n); n = 1, 2, \ldots, N=10. \quad (1)$$

In Expression (1), b=+1 implies an ACK bit, b=−1 implies a NACK bit and b=0 implies a DTX frame. Thus, Expression (2) defines the amplitude, A(b), as a function of the transmitted bit b as:

$$A(b) = \begin{cases} \sqrt{P_A G_{hs}} & \text{if } ACK \text{ bit, } b = 1 \\ 0 & \text{if } DTX \text{ bit, } b = 0 \\ \sqrt{P_N G_{hs}} & \text{if } NACK \text{ bit, } b = -1 \end{cases} \quad (2)$$

In Expression (2), $G_{hs}$ is the spreading factor of HS-DPCCH channel.

De-spread interference plus noise may be represented by $v_l(n) \sim CN(0, \sigma_I^2)$, where $\sigma_I^2 \approx G_{hs} I_o \forall l$. Here $I_o$ is the total received interference and CN(x, y) refers to complex-valued Gaussian noise with mean x and variance y. After channel de-rotation, a detection metric z(n) may be determined, as provided in Expression (3):

$$z(n) + \Re\left\{\sum_{l=1}^{L} \hat{h}_1^*(n) y_1(n)\right\}; n = 1, 2, \ldots, N = 10 \quad (3)$$

Channel estimates $\hat{h}_l(n)$ may be a one-shot estimate, or may be an interpolated channel estimate or a Wiener filter-based estimate for the $l^{th}$ finger. In an effort to make ACK/NACK decisions available as early as possible to the NodeB scheduler, the channel estimate may be assumed to be causal. The channel estimate may also be non-causal, such as a look-ahead smoothed estimate, at the expense of additional processing delay.

There are three possible detection hypotheses: ACK, NACK or DTX. The following describes a generic detection statistic for detecting whether a ACK bit, NACK bit or DTX frame (silence) was transmitted, based on a conventional WG4 detection routine, so as to provide context for the exemplary embodiments of the present invention.

Decision Statistic

A detection statistic, 'z', which may be referred to as a final accumulated detection metric, is a statistic which may enable detection of one of an ACK bit, NACK bit or DTX frame at the NodeB, based on all the information the NodeB receiver knows about the signal transmitted in the uplink from the UE, such as the signaling information transmitted on the HS-DPCCH channel in the uplink. The final accumulated detection metric (z) may be given by the coherent average of the N samples of the received signal z(n) and may be given by Expression (4):

$$z = \frac{1}{N}\sum_{n=1}^{N} z(n) = \quad (4)$$

$$\Re\left\{\frac{1}{N}\sum_{n=1}^{N}\sum_{l=1}^{L} \hat{h}_1^*(n)h_1(n)\right\}A(b) + \Re\left\{\frac{1}{N}\sum_{n=1}^{N}\sum_{l=1}^{L} \hat{h}_1^*(n)v_1(n)\right\} =$$

$$\begin{cases} \hat{A}_{Ack} + \varepsilon & \text{if } ACK \text{ bit is transmitted, } b = +1 \\ -\hat{A}_{Nack} + \varepsilon & \text{if } NACK \text{ bit is transmitted, } b = -1 \\ \varepsilon & \text{if there is no transmission, } b = 0 \end{cases}$$

where, $A_{Ack/Nack} = \sqrt{P_{A/N}}\, G_{hs} \Re\left\{\sum_{l=1}^{L}\sum_{n=1}^{N} \hat{h}_1^*(n)h_1(n)\right\}/N.$ Further, $E[\varepsilon^2] = \sigma^2 = G_{hs}(I_0/2)\sum_{l=1}^{L}\sum_{n=1}^{N} |\hat{h}_1(n)|^2 / N^2$ Here, $A_{Ack}$, $A_{Nack}$ represent the received amplitudes corresponding to the transmission of an ACK bit or a NACK bit, respectively. The noise $\varepsilon$ is additive Gaussian noise with a variance equal to $\sigma^2$. The equation shows that the decision statistic based on the received signal may be expressed as an amplitude with additive noise. Thus, a generic detector for this above additive noise model of Expression (4) may be a threshold-based detector of the form shown in the equations of Expression (5).

Declare ACK iff $z > \tau_A$; or

Declare NACK iff $z < -\tau_N$;

Declare DTX else. (5)

Accordingly, the design of the detector may be influenced by the derivation of the two thresholds for ACK/NACK detection at the NodeB: $\tau_A$ (threshold for detection of ACK bit in the uplink signaling message) and $\tau_N$ (threshold for detection of NACK bit in the uplink signaling message), based on certain meaningful criteria.

Conventional WG4 Detection

Minimum performance requirements for the ACK/NACK detectors developed by different equipment manufacturers are specified in Working Group 4 (WG4) of the Third Generation Partnership Project (3GPP), the standards body for UMTS. Detection performance metrics of interest in the WG4 performance comparison are:

I. Conditional FALSE ALARM Type 1 Event: Conditional probability of DTX→ACK false alarm: Probability [ACK Detected given that DTX Transmitted]=$10^{-2}$. A conditional type 1 false alarm event may represent an event when the ACK/NACK detector declares the bit as ACK when in reality, a DTX bit was transmitted. WG4 chooses the threshold computation based on this requirement II. Conditional FALSE ALARM Type 2 Event: Conditional probability of NACK→HACK error—Probability[ACK Detected given that NACK Transmitted]=$10^{-4}$. A conditional type 2 false alarm event may represent an event when the ACK/NACK detector declares the bit as ACK when in reality, a NACK bit was transmitted. For WG4, this is a requirement that should be met for all scenarios as closely as possible.

III. Conditional MISS Event: Conditional probability of ACK Miss-Detection-Probability[NACK or DTX Detected given that ACK Transmitted]=$10^{-2}$. A conditional miss event may represent an event when the ACK/NACK detector declares the bit as either a NACK or DTX when in reality, an ACK bit was transmitted.

Accordingly, the detector specified in WG4 may be given by Expression (6).

$$\frac{|z|^2}{\hat{\sigma}^2} < 2N\tau_{wg4} \Rightarrow DTX \qquad (6)$$

Else, if $z > 0 \Rightarrow ACK$, otherwise $NACK$.

The WG4 detector described by Expression (6) first constructs a measure of the signal-to-noise ratio, given as the ratio of the absolute value squared of the decision statistic z and the estimated noise variance. If this ratio is less than the threshold $2N\tau_{wg4}$ then a DTX is declared. Otherwise, the sign of z is checked—if it is positive, then an ACK is declared; otherwise, a NACK is declared.

In order to compute the threshold $\tau_{wg4}$, the case when a DTX frame is being transmitted should be considered (i.e., when nothing is sent). The WG4 methodology is to set $\tau_{wg4}$ such that the conditional probability of false alarm (the probability of the event when the detector declares an ACK given that a DTX is transmitted) is set to some target probability of false alarm $p_0$. Thus, the probability of DTX being detected as ACK or NACK is $2p_0$. This constraint is referred to the classical Neyman-Pearson detection constraint corresponding to the false alarm. The threshold $\tau_{wg4}$ may be computed by Expression (7) below:

$$2p_0 = Pr[|z|^2/\hat{\sigma}^2 > 2N\tau_{wg4} | DTX \text{ Transmitted}] \qquad (7)$$
$$= Pr[|\varepsilon|^2/\sigma^2 > 2N\hat{\sigma}^2\tau_{wg4}/\sigma^2] = erfc\left(\sqrt{N\tau_{wg4}\hat{\sigma}^2/\sigma^2}\right)$$
$$\tau_{wg4} = \left(\frac{\sigma^2}{\hat{\sigma}^2}\right)\frac{[erfc^{-1}(2p_0)]^2}{N}$$

where $erfc(x) = 2/\sqrt{\pi}\int_x^\infty \exp(-t^2)dt$.

If perfect estimation (or knowledge) of interference probability distribution is assumed and its statistics (i.e., that the noise is truly Gaussian and the estimate of the interference variance is exactly equal to the true interference variance ($\hat{\sigma}^2=\sigma^2$), then the $\tau_{wg4}$ threshold in Expression (7) may be computed offline (i.e., not in real time) for any given value of $p_0$. In WG4, the preferred choice of $p_0$ is $10^{-2}$. However, simulations by the inventors, in at least one example, have indicated that for satisfactory performance of all the other performance metrics, a $p_0$ of $10^{-3}$ should be chosen, although other values may be selected depending on the desired applications and/or metric performance, as is evident to one having ordinary skill in the art. A $p_0=10^{-3}$ may lead to a threshold value $\tau_{wg4}=-3.8$ db. Expression (7) with the $-3.8$ db value of $\tau_{wg4}$ may henceforth be referred to as the WG4 detector.

Detecting Signaling Information Using Threshold Estimation

A generic WG4 detection methodology having been described, the exemplary embodiments of the present invention are directed to methods of detecting signaling information such as detection of ACK/NACK signaling in the uplink. The exemplary methodologies may utilize an adaptive or estimated value for signal detection. If the noise $\epsilon$ is not Gaussian, due to quantization effects, etc, and/or its variance is not perfectly known, then implementing Expression (7) may not be feasible. In such a case, an estimated value such as a threshold may need to be estimated via other means. Accordingly, an adaptive methodology for detecting signal information is now described which may converge to a true solution for an estimated value such as a threshold so as to result in a false alarm type 1 of $p_0$.

In an actual wireless communication system, a particular UE may be scheduled roughly every K TTI, where K is the total number of HSDPA users in the system. This is a property of any fair resource allocation scheduling discipline. Thus, there is a vast fraction of time when a user is not scheduled. At such times, the HS-DPCCH receiver at the Node-B corresponding to (serving) the UE knows to expect a DTX frame from that UE. As a result, these TTIs may be used for training, so as to adapt the threshold for ACK/NACK detection such that the threshold converges to an optimum value.

In the discussion below, the ACK threshold may be considered equal in magnitude to the NACK threshold, although this is not a required assumption for the exemplary methodology. This may be possible in the WG4 detection context, so the threshold may be solely based on the probability of detecting an ACK when a DTX is transmitted, which corresponds mostly to the case when a UE is not scheduled. The other times when a DTX gets transmitted is when the UE misses the detection of HS-SCCH. But at the receiver of the Node-B side, there is no way of knowing when this happens.

A methodology for detecting signaling information using an adaptive threshold may be an up-down threshold algorithm given by the following updating equations in Expression (8).

$$\hat{\tau}(t+1) = \begin{cases} \hat{\tau}(t)\delta_{up} & \text{if } |z(t)|^2/\hat{\sigma}^2 > 2N\hat{\tau}(t) \\ \hat{\tau}(t)\delta_{dn} & \text{if } |z(t)|^2/\hat{\sigma}^2 \leq 2N\hat{\tau}(t) \end{cases} \qquad (8)$$

In Expression (8), $z(t)\equiv z$ is the decision statistic for TTI t. The threshold value at time (TTI) t is given by $\hat{\tau}(t)$ and $\hat{\sigma}^2$ is an estimate of the interference variance. Expression (8) illustrates that a threshold for a subsequent time instant $\hat{\tau}(t+1)$ for detecting signaling information in signal received in the subsequent time instant (such as the next TTI) may be determined or estimated in real time based on measured parameters such as $z(t)$ and $\hat{\sigma}^2$ that are related to a current threshold estimate at time t, or $\hat{\tau}(t)$.

The exemplary methodology may be implemented using some initial estimate, $\hat{\tau}(0)$, and then to apply Expression (8) such that the threshold eventually converges to $\tau_{wg4}$ of Expression (7). The parameters $\delta_{up}$, $\delta_{dn}$ may represent step sizes by which the current threshold estimate at time t may be incremented or decremented by, respectively, to obtain a revised or modified threshold estimate at time t+1.

Accordingly, the up and down-steps should be appropriately selected. For example, the up and down steps may be determined based on an equilibrium point condition. At equilibrium, the net increase in the threshold should be matched by its net decrease. At convergence, the increase may occur with a probability that is equal to about twice the target probability of false alarm, $2p_0$. Thus, the up and down steps may be described by the following equations in Expression (9):

$$\delta_{up} \text{ (dB)}(2p_o) - \delta_{dn} \text{ (dB)}(1 - 2p_o) = 0 \qquad (9)$$

where $\delta_{up/dn} \text{ (dB)} = 10 * \log(\delta_{up/dn})$.

By choosing a small value of $\delta_u n$, we have:

$$\delta_{up} \text{ (dB)} = \delta_{up} \text{ (dB)} \frac{(1 - 2p_o)}{2p_o}$$

The step sizes by which the thresholds (for ACK bit, NACK bit and/or DTX detection) are incremented or decremented may be determined by Expression (9). Expression (9) shows that the up/down steps are related by a scaling factor, $$\frac{(1 - 2p_o)}{2p_o},$$

that depends on the required (target) false alarm probability $p_0$. If one of the step sizes, say $\delta_{dn}$ is chosen to be a small value, then $\delta_{up}$ may be automatically determined by the relation given in (9).

The control loop of Expression (9) may be similar to outerloop power control in traditional CDMA systems. The methodologies may be refined by decreasing the threshold step size based on how close the average probability of false alarm type 1 is to the target probability $p_0$. Accordingly, the average probability of false alarm may be continuously updated when the Node-B receiver knows that a DTX frame is expected. Once the average computed probability of false alarm is close to the required target false alarm probability, the step sizes $\delta_{up}$ and $\delta_{dn}$ may be reduced so as to allow the algorithm to settle to the final threshold value.

The exemplary methodologies may provide some benefits. One advantage may lie in its simplicity of implementation and the control nature of the process, whereby modeling an estimation errors of the underlying processes are automatically adjusted for by the methodology in Expressions (8) and (9) for determining the desired threshold to use. Further, changing the target probability of false alarm is rather straight forward using the above methodologies. For example, if the target false alarm probability $p_0$ is to be adjusted to a different value, then $p_0$ may be set to the new value in the exemplary methodology in Expression (9). The algorithm may thus automatically adapt the thresholds (essentially in real time) so as to converge to a new threshold value that will result in a false alarm probability equal to the new target probability.

EXAMPLES

Figure 2:
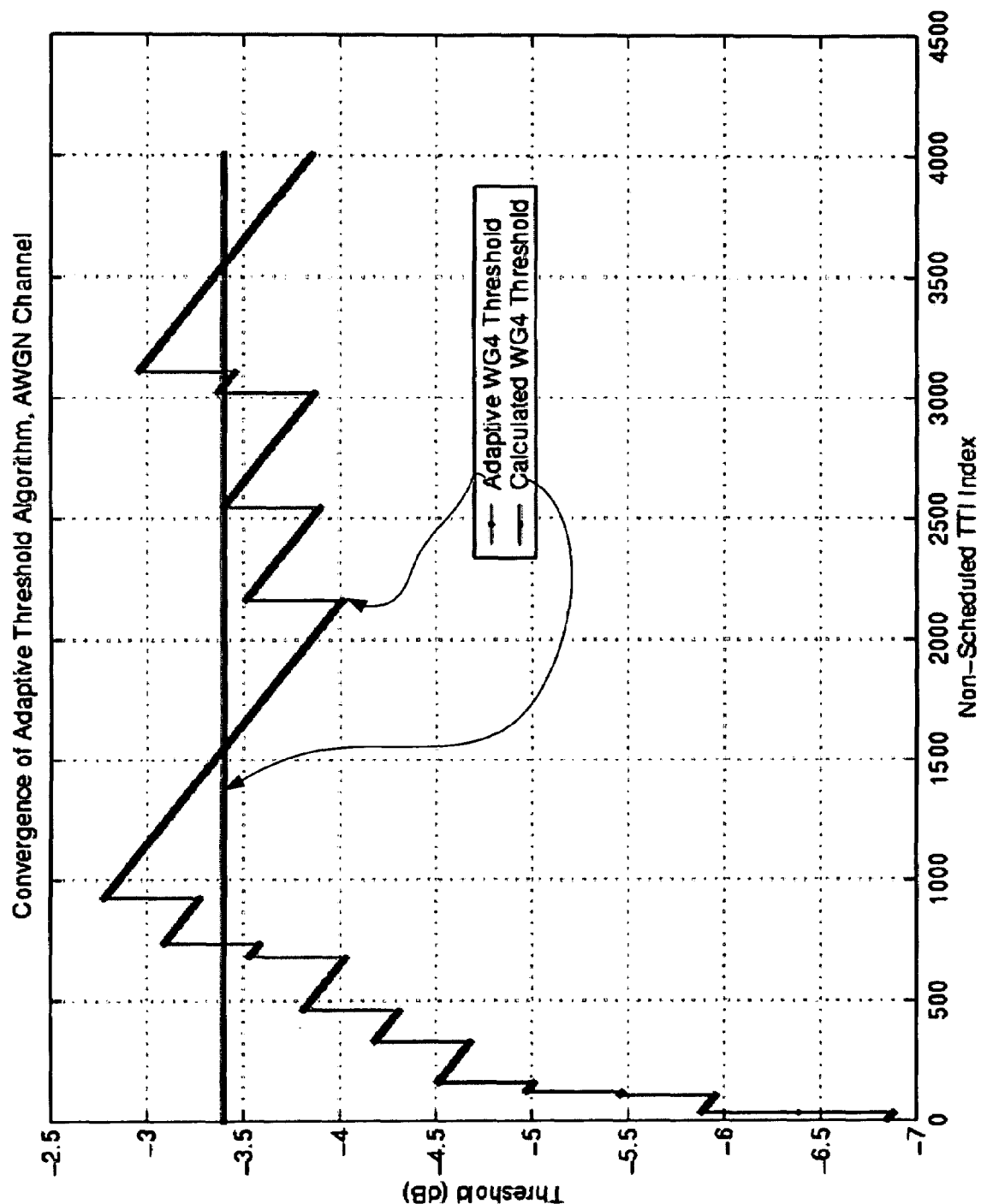

FIGS. 1 and 2 are graphs illustrating convergence behavior for a threshold determined in accordance with the exemplary embodiments of the present invention. The convergence of the methodology for determining a threshold for signal message detection may be illustrated in FIGS. 1 and 2. FIG. 1 illustrates convergence behavior for a substantially low starting point of the threshold, about −34 dB. FIG. 2 illustrates convergence behavior with an improved starting point of the threshold, about −6.8 dB. The x-axis in each of FIGS. 1 and 2 represents a non-scheduled TTI index and a Y axis represents the threshold in (DB). Fast convergence may be achieved even with a very low starting value (See FIG. 1) of the threshold. As the convergence improves, the step size may be gradually reduced (FIG. 2) so as to not result in large variations around the true threshold.

The exemplary embodiments of the present invention being thus described, it will be obvious that the same may be varied in many ways. Such variations are not to be regarded as a departure from the spirit and scope of the exemplary embodiments of the present invention, and all such modifications as would be obvious to one skilled in the art are intended to be included within the scope of the following claims.

What is claimed is:

1. A method of detecting signaling information in a signal received in a wireless communication system, comprising:
    detecting signaling information for a signal received in a subsequent time instant using an estimated value for the subsequent time instant that is determined based on one or more measured parameters related to an estimated value for detecting signaling information in a current time instant, the detecting including comparing a ratio of the measured parameters to the current estimated value.

2. The method of claim 1, wherein the detecting further includes,
    determining an estimated adjustment to the current estimate value for the subsequent time instant based on the comparison.

3. The method of claim 1, wherein the ratio of measured parameters is a ratio of a decision statistic for the received signal to an estimated variance in the interference associated with the received signal.

4. The method of claim 3, wherein the decision statistic is determined as a function of an amplitude of one of an ACK bit or an NACK bit in the received signal and additive Gaussian noise.

5. The method of claim 2, wherein the determining further includes incrementing or decrementing the current estimated value by a given step size based on the comparison.

6. The method of claim 5, wherein the given step size is based on a target probability of false alarm value.

7. The method of claim 2, wherein the determining further includes incrementing the current estimated value by a given step size to determine the estimated value for the subsequent time instant, if the comparison indicates that the ratio of measured parameters exceeds the current estimated value.

8. The method of claim 7, wherein the given step size is based on a target probability of false alarm value.

9. The method of claim 2, wherein the determining further includes decrementing the current estimated value by a given step size to determine the estimated value for the subsequent time instant, if the comparison indicates that the ratio of measured parameters is less than or equal to the current estimated value.

10. The method of claim 9, wherein the given step size is based on a target probability of false alarm value.

11. The method of claim 1, wherein the current estimate value or estimated value for the subsequent time instant is an estimated threshold for detecting one of an acknowledgment (ACK) bit, a negative acknowledgment (NACK) bit and a discontinuous transmission (DTX) frame in the signaling information.

12. In a wireless communication system, a detector of a base station receiver configured so as to detect signaling information in a received signal in accordance with the method of claim 1.

13. A method of detecting signaling information in a signal received in a wireless communication system, comprising:
 detecting signaling information in a subsequent time instant using an estimated value for signal detection, the estimated value adjusted based on channel measurements in a current time instant that are related to the received signal, the detecting including comparing a ratio of the channel measurements of the received signal to the current estimated value.

14. The method of claim 13, wherein the detecting further includes adjusting an estimated value for detecting the signal in the current time instant to determine the estimated value for the subsequent time instant, the adjusting based on the comparison.

15. The method of claim 14, wherein adjusting further includes incrementing the current estimated value by a given step size to determine the estimated value for the subsequent time instant, if the comparison indicates that the ratio of measured parameters exceeds the current estimated value, and the given step size is based on a target probability of false alarm value.

16. The method of claim 14, wherein adjusting further includes decrementing the current estimated value by a given step size to determine the estimated value for the subsequent time instant, if the comparison indicates that the ratio of measured parameters is less than or equal to the current estimated value, and the given step size is based on a target probability of false alarm value.

17. The method of claim 13, wherein the current estimated value or estimated value for the subsequent time instant is an estimated threshold for detecting one of an acknowledgment (ACK) bit, a negative acknowledgment (NACK) bit and a discontinuous transmission (DTX) frame in the signaling information of the received signal.

18. A method of detecting signaling information for a signal received in a subsequent time instant, comprising:
 dynamically adjusting an estimate value used for signal detection in a current time instant so as to detect the signaling information using the adjusted estimated value, the adjusting including comparing a ratio of measured parameters related to the estimated value for detecting signaling information in a current time instant to the current estimated value.

19. The method of claim 18, wherein the current estimated value or adjusted estimated value is an estimated threshold for detecting one of an acknowledgment (ACK) bit, a negative acknowledgment (NACK) bit and a discontinuous transmission (DTX) frame in the signaling information.

20. The method of claim 18, wherein the adjusting further includes determining an estimated adjustment to the current estimate value for the subsequent time instant based on the comparison.

* * * * *